United States Patent [19]

Le Devehat

[11] Patent Number: 5,322,479

[45] Date of Patent: Jun. 21, 1994

[54] ENDLESS BELT POWER TRANSMISSION SYSTEM

[75] Inventor: Christian Le Devehat, Nevers, France

[73] Assignee: Caoutchouc Manufacture Et Plastiques, Versailles Cedex, France

[21] Appl. No.: 995,815

[22] Filed: Dec. 23, 1992

[30] Foreign Application Priority Data

Dec. 26, 1991 [FR] France ................... 91 16289

[51] Int. Cl.$^5$ ............................................. F16G 1/04
[52] U.S. Cl. ................................... 474/101; 474/265
[58] Field of Search ......................... 474/260–265, 474/268, 237

[56] References Cited

U.S. PATENT DOCUMENTS

| | | | |
|---|---|---|---|
| 3,563,103 | 2/1971 | Sauer | 474/265 X |
| 4,099,422 | 7/1978 | Cicoghani et al. | 74/231 |
| 4,626,232 | 12/1986 | Witt | 474/205 |
| 4,695,269 | 9/1987 | Tassone et al. | 474/265 X |
| 4,868,029 | 9/1989 | Nakagawa et al. | 428/163 |

FOREIGN PATENT DOCUMENTS

| | | |
|---|---|---|
| 0018456 | 11/1980 | European Pat. Off. |
| 0451983 | 10/1991 | European Pat. Off. |
| 0452488 | 10/1991 | European Pat. Off. |
| 0455417 | 11/1991 | European Pat. Off. |
| 0214538 | 9/1988 | Japan |
| 64-58831 | 3/1989 | Japan |
| 158831 | 3/1989 | Japan |
| 1269743 | 10/1989 | Japan |
| 8404951 | 10/1984 | PCT Int'l Appl. |

OTHER PUBLICATIONS

Rubber & Plastics News, "Accurate Tests for Elastomers Under Hood", Ken Jones, Leonard L. Outz, George Liolios, Feb. 18, 1991, pp. 31–36.
Brochure entitled ACSM High Performance Synchronous Timing Belt, Dayco Products Inc., 1991.

*Primary Examiner*—Thuy M. Bui
*Attorney, Agent, or Firm*—Nils H. Ljungman & Associates

[57] ABSTRACT

A power transmission system for the transmission of power or the transmission of movement from a first device to a second device comprises an endless flexible belt for transmitting power from a first power driven device to a second device for receiving the power. Such a belt can preferably be a toothed belt, also called a synchronous belt, as used, for example, on internal combustion engines for the synchronous propulsion of cam shafts at the cylinder head, and which belt has a construction capable of withstanding the operating environment for which it is intended.

14 Claims, 3 Drawing Sheets

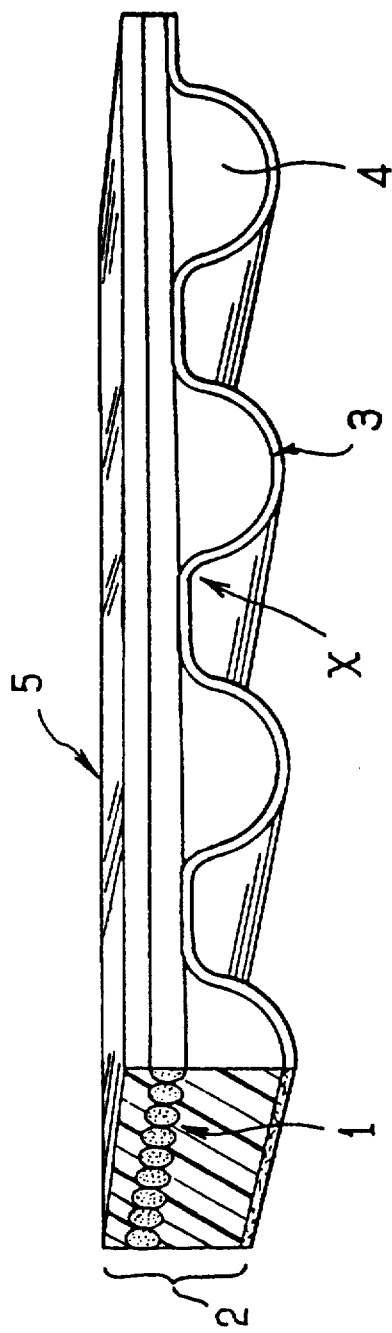
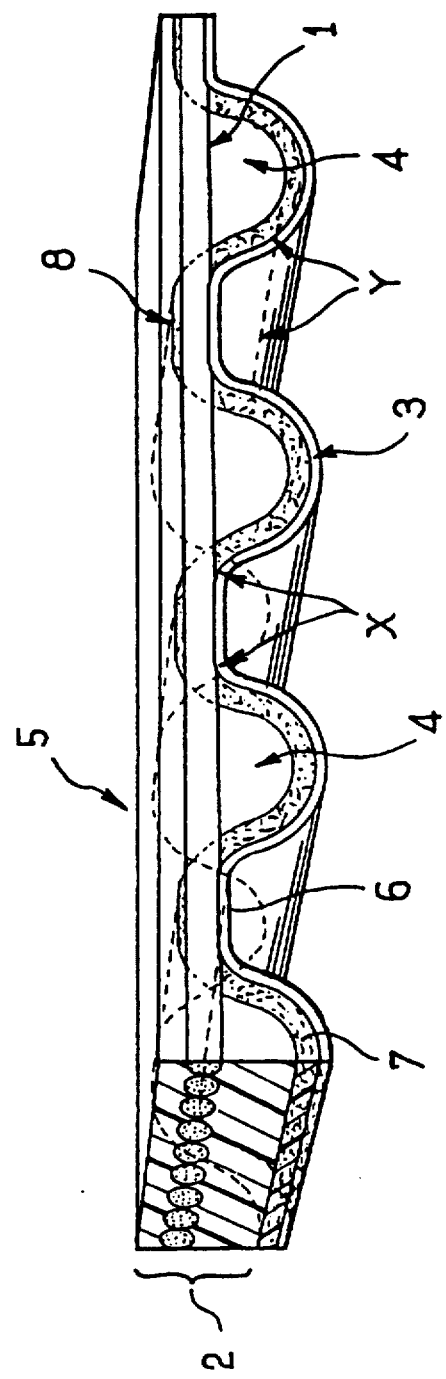

ENDLESS BELT POWER TRANSMISSION SYSTEM

BACKGROUND OF THE INVENTION

1. Field of the Invention

This invention relates to a power transmission system for the transmission of power or the transmission of movement from a first device to a second device. In general, such power transmission systems operate by means of belts, i.e. endless flexible belts which operate by mechanical adherance, or friction. In particular, such belts can be toothed belts, also called synchronous belts, as used, for example, on internal combustion engines for the synchronous propulsion of cam shafts at the cylinder head.

The vehicle engine generally encloses the synchronous toothed belt in a housing which is generally not very well vented, but which housing can theoretically be quite dry. When used on an internal combustion engine of a vehicle, such belts can typically be exposed to detrimental conditions such as sprays of high temperature oil. Further, because of the lack of ventilation for such a housing, the belt, as well as being exposed to possible oil sprays, is also exposed to the high temperatures produced by the engine in the form of thermal radiation which emanates from the walls of the crankcase.

2. Background Information

Such endless transmission belts are typically composed of a flexible armature in combination with at least one elastomer. On a first side of the belt, there can be a plurality of teeth formed by a first elastomer, and preferably covered by a protective fabric, while the opposite side of the belt can comprise an elastomer compound that can be identical to or different from the elastomer compound used for the teeth. On this opposite side of the belt, the elastomer compound essentially forms the back-side of the belt and serves to protect the flexible armature. This back-side can be smooth, can have longitudinal corrugations for a friction drive, or can have identical or different teeth for engagement on matching pulleys.

The problem of creep during operation, which has long been a source of problems and the failure of such belts, has been solved by the utilization of steel, glass or aramid fibers as the flexible armature. Thus, the useful life of synchronous belts has, for the most part, become a direct function of the mechanical strength and thermal resistance of the elastomer base compounds used in the composition of the teeth and of the back of the belts.

Because of the problems associated with internal combustion engines, such transmission belts generally needed to be made from an elastomer which was resistant to repeated bending stresses, was resistant to ozone and oil, and had a high-temperature resistance up to about 100 degrees C. For these purposes, polychloroprene base compounds generally provided satisfactory results. However, given the increased severity of the conditions in which such belts currently are used, and in particular the increase in temperatures under the hood, the previously used polychloroprene compounds are currently insufficient. In this regard, given the increasing severity of the requirements set by designers, manufacturers of automobile equipment have particularly devoted their research efforts to high-performance elastomer compounds. Such new high-performance elastomer compounds have been made possible by the development of new polymers.

In an attempt to meet the increased requirements for transmission belts, French Patent No. 2 334 021 to Pirelli proposes the use of epichlorohydrin matrix compounds, and French Patent No. 2 628 678 to Tosch Corp. proposes the use of chlorosulfonated ethylenealpha-olefin copolymer (CSM) matrix compounds for constructing the belts. It should be noted, however, that although the belts realized with these elastomers exhibit a positive increase of operational characteristics at higher temperatures, such belts retain a sensitivity to oils which thereby reduces their performance in case of accidental contact with any oil.

To remedy the disadvantage of insufficient resistance to hot oils, while maintaining a satisfactory level of useful life, other embodiments have been proposed with compounds of hydrogenated butadiene-acrylonitrile copolymer (HNBR) matrix, which is a highly saturated nitrile.

Belts constructed with the same hydrogenated butadiene-acrylonitrile copolymer (HNBR) matrix elastomer compound on the back and in the teeth, i.e. the entire belt being homogeneously constructed with the HNBR elastomer, are disclosed in International Publication No. WO 89/12076 to Nippon Zeon and Japanese Patent No. 01-269743 to Bando Chemical. Nevertheless, the improvement of the resistance to oils is achieved at the expense of an increased cost of making such belts, due to the higher cost of the base elastomer.

Japanese Patent No. 64-588311, also to Bando, discloses an improvement in performance, without an excessive cost increase. This improvement is the result of the combination of an alkylated chlorosulfonated ethylene-alpha-olefin copolymer (ACSM), forming the back and the teeth of the belt, with a fabric covering on the teeth, which fabric covering is impregnated with a hydrogenated butadiene-acrylonitrile copolymer (HNBR) matrix elastomer compound. A major problem with such a belt is the adherence of the fabric coated with a mixture of hydrogenated butadiene-acrylonitrile copolymer (HNBR) to the mass of the alkylated chlorosulfonated ethylene-alpha-olefin copolymer (ACSM). At high stresses, the weak points in the structure provide possible areas for the advance of moisture or oil into the belt via the cut flanks of the belt and the seams between elements of the fabric covering of the teeth.

The interface between the fabric and the alkylated chlorosulfonated ethylene-alpha-olefin copolymer (ACSM) matrix compound forming the teeth, is essentially the most highly-stressed point of the belt, and is subjected, in particular, to bending stresses as the base of the teeth.

Hairline cracks in the elastomer compound essentially signal the end of the useful life of the belt. Such hairline cracks have a tendency to appear first at this interface at the base of the teeth, and this interface area is typically the point which is the least well protected against oil impregnations.

OBJECT OF THE INVENTION

The object of the present invention is to extend the useful life of the flexible belts of an endless belt power transmission system, particularly of synchronous belts used in an aggressive environment having a high risk of contact with hot oil. In addition to extending the useful life of the belts, it is also an object of the present invention to essentially maintain the mechanical strength of the belt at high temperatures.

SUMMARY OF THE INVENTION

To accomplish this objective, the invention proposes a combination of an alkylated (ACSM) or non-alkylated (CSM) chlorosulfonated ethylene-alpha-olefin copolymer matrix elastomer compound, with a hydrogenated butadiene-acrylonitrile copolymer (HNBR) matrix elastomer compound, both of which elastomer compounds have good mechanical strength at high temperatures. The hydrogenated butadiene-acrylonitrile copolymer (HNBR) matrix elastomer compound, in addition to having good mechanical strength at high temperatures, also provides protection against the aggression of hot motor oil. This protection is provided at the level of the interface between the fabric covering of the teeth and the elastomer compound constituting the core of the teeth on the one hand, and between the fabric covering of the teeth and the cord constituting the flexible armature of the belt. The hydrogenated butadiene-acrylonitrile copolymer (HNBR) matrix elastomer compound is therefore located at the base of the teeth, with the interface between the alkylated (ACSM) or non-alkylated (CSM) chlorosulfonated ethylene-alpha-olefin copolymer matrix elastomer compound and the hydrogenated butadiene-acrylonitrile copolymer (HNBR) matrix elastomer compound being thereby offset toward the interior of the teeth.

The invention is therefore a refinement of toothed, flexible belts. In particular, the invention is a refinement of synchronous belts in which the back of the belt and the teeth on at least one of the sides of the belt are preferably formed of an alkylated chlorosulfonated ethylene-alpha-olefin copolymer (ACSM) matrix elastomer compound or a non-alkylated chlorosulfonated ethylene-alpha-olefin copolymer (CSM) matrix elastomer compound, and in which belts a hydrogenated butadiene-acrylonitrile copolymer (HNBR) matrix elastomer compound, which may be reinforced with short fibers, covers the surface of the teeth. The teeth are preferably protected by a fabric treated by the impregnation of a hydrogenated butadiene-acrylonitrile copolymer (HNBR) matrix elastomer compound into the fabric.

The invention is characterized by the fact that the bonding interface between, on the one hand, the hydrogenated butadiene-acrylonitrile copolymer (HNBR) matrix elastomer compound constituting the impregnation material of the treated fabric, and on the other hand, the alkylated chlorosulfonated ethylene-alpha-olefin copolymer (ACSM) or non-alkylated chlorosulfonated ethylene-alpha-olefin copolymer (CSM) matrix elastomer compound, forming the substrate of the back of the belt and of the teeth, is offset toward the interior of the teeth. This offset makes the interface fall in a zone which is exposed to less stress during operation of the toothed flexible belt than if the interface were at the location adjacent the fabric covering. Further, such an offset is made possible by means of the interposition of an intermediate moderator element—a protective pad and/or an anisotropically reinforced shield or barrier—so that the mechanical strength of the flexible, toothed belt at elevated temperatures is not altered by hot oil sprays coming from the motor.

The invention is also characterized by the fact that the intermediate moderator element is realized from an elastomer compound of a hydrogenated butadiene-acrylonitrile copolymer (HNBR) matrix, of a type which can be identical to or different from the HNBR elastomer impregnation compound of the treated fabric. This intermediate moderator element may also possibly be reinforced with short fibers.

The invention is also characterized by the fact that the cords of the flexible armature of the belt are embedded inside the intermediate moderator element in the zone located between two consecutive teeth of the toothed portion of the belt.

In a variant of the above embodiment, an additional bonding layer, which can also be reinforced, of an alkylated chlorosulfonated ethylene-alpha-olefin copolymer (ACSM) or a non-alkylated chlorosulfonated ethylene-alpha-olefin copolymer (CSM) matrix elastomer compound, can be interposed between the intermediate moderator element and the substrate. As discussed above, the substrate can also be constructed of an alkylated chlorosulfonated ethylene-alpha-olefin copolymer (ACSM) or an non-alkylated chlorosulfonated ethylene-alpha-olefin copolymer (CSM) matrix elastomer compound.

In summary, one aspect of the invention resides broadly in a toothed belt endless belt power transmission system. The system comprises: a mechanical power generating device for generating mechanical power, a first wheel device connected to and receiving mechanical power from the mechanical power generating device, a second wheel device positioned in spaced apart relation to the first wheel device, the second wheel device being connected to and receiving at least a portion of the mechanical power from the first wheel device, and a toothed belt disposed about and connected between the first wheel device and the second wheel device for transferring mechanical power from the first wheel device to the second wheel device. The belt has a first surface for being disposed towards the first and the second wheel devices, and a second surface opposite to the first surface. The system further comprises a belt tensioning device for being in contact with the second surface of the belt means for adjusting a tension of the belt means about the first and the second wheel devices. The toothed belt comprises a plurality of teeth disposed along the first surface, the plurality of teeth being spaced apart from one another in a longitudinal dimension of the belt, a first material having high mechanical strength, the first material comprising at least the second surface and a substantial portion of the teeth, a covering disposed on the first surface of the belt, the covering comprising a second material, and an intermediate layer disposed between the first material and the covering, the intermediate layer being configured for distributing stress towards an interior of the belt.

Another aspect of the invention resides broadly in toothed flexible belt for an endless belt power transmission system. The belt has an inner surface, an outer surface and a longitudinal dimension, with the inner surface comprising a plurality of spaced apart teeth disposed on the inner surface. The belt comprises a first material having a high mechanical strength at operating temperatures of the power transmission system, the first material comprising at least the outer surface and a substantial portion of the teeth, a cover device disposed on the inner surface to cover the inner surface and protect the first material, at least one intermediate layer disposed between the first material and the cover device, the at least one intermediate layer for distributing stress towards an interior of the belt, the intermediate layer comprises at least one component, the cover device comprising at least one component, and the at least one component of the intermediate layer being the same as the at least one component of the cover device, the at least one component extending through the cover device and the at least one intermediate layer.

Another aspect of the invention resides broadly in a toothed flexible belt for a power transmission system. The belt having an inner surface, an outer surface and a longitudinal dimension, with the inner surface comprising a plurality of spaced apart teeth disposed on the inner surface, the teeth being spaced apart from one another in a direction along the longitudinal dimension of the belt. The belt comprises a first portion, the first portion comprising at least a substantial portion of the teeth and the outer surface, the first portion comprising a first elastomer compound having a high mechanical strength at operating temperatures of the power transmission system, a fabric cover disposed on the inner surface to protect the first elastomer compound, the fabric cover comprising a second elastomer compound, at least one intermediate layer disposed between the first portion and the fabric cover, the at least one intermediate layer for distributing stress towards an interior of the belt, the at least one intermediate layer comprising a third elastomer compound, and the third elastomer compound having at least one component, the at least one component of the third elastomer compound being the same as a component of the second elastomer compound.

BRIEF DESCRIPTION OF THE DRAWINGS

The invention is explained below in greater detail, with reference to the accompanying drawings, in which:

FIG. 1 shows, in perspective, a known structure of a synchronous flexible belt, along what can be termed the straight-line portion of its trajectory between two pulleys;

FIG. 2 shows, also in the straight-line portion, the arrangement of the components of the structure of a flexible, toothed belt, here a synchronous belt, improved in accordance with the present invention.

DESCRIPTION OF THE PREFERRED EMBODIMENTS

Figure 1A:
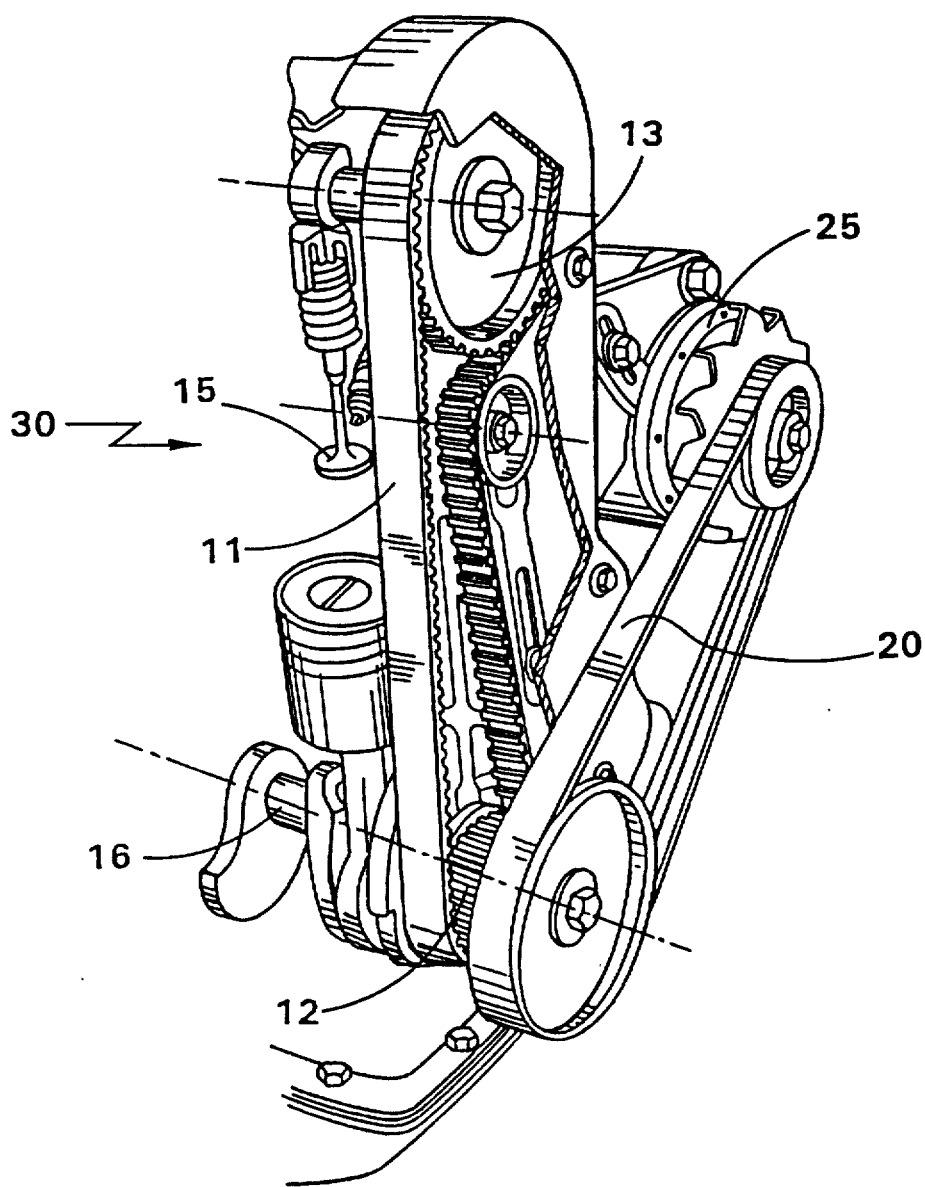
FIG. 1a shows an endless belt power transmission system for an internal combustion engine.

FIG. 1a shows a known combustion engine, which can be used, for example, in an automobile. Internal combustion engines 30 are usually designed to operate a plurality of accessories, such as an alternator 25, a water pump (not shown), etc., in addition to typically propelling an automobile or the like or providing power for stationary purposes. Under typical operating conditions, the belt 11 transfer mechanical power from the pulley 12 to the pulley 13. This type of operation can essentially only be possible when the belt 11 is tensioned properly about the pulleys 12 and 13. The drive pulley 12 can further operate the other automobile accessories by means of an additional belt 20.

In typical applications, such as an automobile engine, the pulleys 12 and 13 need to be operated synchronously with one another in order to ensure properly timed opening and closing of valves 15 in relation to the movement of the shaft 16. To accomplish this synchronous operation, such drive can be provided by toothed belts, such as belt 11, in conjunction with properly sized pulleys 12 and 13. Because such synchronous belts are generally enclosed within a portion of the engine, the belts are typically subjected to the high operating temperatures of the engine. For this reason, as well as others, such as exposure to oil sprays, these belts need to be formulated to meet the requirements of modern automobile needs.

FIG. 1 shows the conventional structure of a synchronous belt designed in accordance with the prior art. The section of belt in FIG. 1, is shown in a "transparent" perspective view, along what can be termed the straight-line portion of its trajectory between two pulleys. The flexible armature 1 of the belt is preferably formed of a layer of cords, or twisted fibers, coiled in a spiral with adjacent turns, during manufacture.

The flexible armature 1 can generally be constituted by glass or aromatic polyamide fibers, which fibers are treated chemically to achieve, during vulcanization, an intimate bond with the elastomer compound of the substrate 2 in which the armature 1 is embedded. The structure of the synchronous flexible belt can be supplemented by a treated fabric 3 which covers the exposed surface of the teeth. The treated fabric 3 can preferably be a twilled fabric impregnated with a solution of the elastomer compound to which the fabric is intended to adhere.

The elastomer compound of the substrate 2 preferably constitutes the core of the teeth 4 in addition to the back 5 of the belt, which back 5 can form the external surface of the synchronous flexible belt. The fabrication process, during the vulcanization operation, can, under the effect of a pressure, consist of having the elastomer compound, located on the back of the winding constituting the flexible armature 1, penetrate through the armature 1. This will generally flatten the treated fabric 3 against an assembly drum which serves as an internal mold for forming the teeth of the synchronous flexible belt. The temperature and the pressure applied during the vulcanization step bring about the intimate bonding of the elastomer compound of the substrate 2 both with the treated fabric 3, and with the cords of the flexible armature 1 which has been traversed during this operation. During operation, the zones (X) are generally subjected to the highest stress, as a result of the mechanical fatigue at the base of the tooth. This is essentially the case because, in the base area between teeth, a high level of adherence must be maintained at the interface between the treated fabric 3 and the cord of the flexible armature 1, even in case of accidental contact with hot motor oil.

The flanks of the synchronous flexible belt are generally cut along the straight sections of the cylindrical sleeve.

The protective pad 7, interposed between the alkylated chlorosulfonated ethylene-alpha-olefin copolymer (ACSM) matrix elastomer compound or the non-alkylated chlorosulfonated ethylene-alpha-olefin copolymer (CSM) matrix elastomer compound forming the teeth and the treated fabric 3 covering the teeth along the entire length of the belt, is preferably intimately bonded to each of these layers. The presence of the protective pad 7 results in the creation of zones 8 of partly-coated flexible armature 1. In these zones 8, the flexible armature 1 can essentially be locally traversed by the hydrogenated butadiene-acrylonitrile copolymer (HNBR) matrix compound of the protective pad 7.

Possibly the most "fragile" portions of the interface are the zones (X) where the treated fabric 3 is approximately tangent to the flexible armature 1. These zones (X) are, according to the present invention, essentially totally embedded in the hydrogenated butadiene-acrylonitrile copolymer (HNBR) matrix compound. Thus, improved protection against deterioration due to oil is achieved, and this thereby protects the alkylated (ACSM) or non-alkylated (CSM) chlorosulfonated ethylene-alpha-olefin copolymer matrix elastomer compound of the teeth.

Consequently, the interface between the two elastomer compounds is offset in relation to the base of the teeth as a result of the existence of the partly coated zone 8 of the flexible armature 1. More particularly, this interface is, on the one hand, offset inwardly towards the core of the teeth 4, which core of the teeth 4 preferably consists for the most part of the alkylated (ACSM) or non-alkylated (CSM) chlorosulfonated ethylene-alpha-olefin copolymer matrix, and on the other hand, is offset inwardly towards the thickness of the back 5 of the belt.

The elastomer compound of the substrate 2, with an alkylated (ACSM) or non-alkylated (CSM) chlorosulfonated ethylene-alpha-olefin copolymer matrix, provides the physico-chemical bonding with the flexible armature 1, in the areas in continuity with the core of the teeth 4, that is, along all of the remaining portions of the flexible armature, except for the zones 8 of partial coating by the protective pad 7.

Preferably, the thickness of the protective pad 7, which can preferably be substantially constant, is between about 0.1 to about 0.6 times the height of the teeth measured between the treated fabric 3 and the flexible armature 1. Thus, the interface zones, i.e. zones (X), which have a lower mechanical strength in the event of contact and deterioration by hot motor oil, are not only farther from the internal surface 6 between teeth and from the external surface of the back 5 of the belt, but the contact surface at the interface between the two elastomer compounds is also very significantly increased in relation to the length of the synchronous flexible belt. These two elastomer compounds are essentially the hydrogenated butadiene-acrylonitrile copolymer (HNBR) matrix and the alkylated (ACSM) or non-alkylated (CSM) chlorosulfonated ethylene-alpha-olefin copolymer matrix.

Belts constructed with treated fabric 3 will also generally have discontinuity zones (Y), where edges of adjacent elements of treated fabric 3 form a seam. Because of the presence of the protective pad 7, any exposed edges of the fabric elements at the seam, can be deeply embedded in the hydrogenated butadiene-acrylonitrile copolymer (HNBR) matrix which makes up the protective pad 7. This use of the protective pad 7 also makes it possible for the edges of adjacent fabric elements 3 to be disposed farther from the interface between the hydrogenated butadiene-acrylonitrile copolymer (HNBR) matrix compound and the alkylated (ACSM), or non-alkylated (CSM) chlorosulfonated ethylene-alpha-olefin copolymer matrix compounds. The interpositioning of the protective pad 7 thus increases resistance to contact of the ACSM or CSM elastomer compounds by oil. Without the presence of the protective pad 7, such oil contact could occur by oil running along, and penetrating into, the seamed edges of the elements of the treated fabric 3. As discussed previously, such oil contact with the ACSM or CSM elastomer compounds can generally result in a weakening of the characteristics of the elastomer compound of the alkylated (ACSM) or non-alkylated (CSM) chlorosulfonated ethylene-alpha-olefin copolymer matrix substrate 2.

The service life of the flexible, toothed belts is thus significantly increased by the following four improvements, namely:

1) uninterrupted contact between the fabric impregnated with hydrogenated butadiene-acrylonitrile copolymer (HNBR) matrix elastomer compound and the protective pad 7, which also consists of a hydrogenated butadiene-acrylonitrile copolymer (HNBR) matrix elastomer compound;
2) the coating of the cord of the flexible armature 1 in the zones 8 located between two adjacent teeth;
3) the elimination of contact, at the base of the teeth, between the cord of the flexible armature 1, the treated fabric 3, and the elastomer compound of the substrate 2, which elastomer compound is an alkylated (ACSM) or non-alkylated (CSM) chlorosulfonated ethylene-alpha-olefin copolymer matrix; and
4) the presence of a protective environment of hydrogenated butadiene-acrylonitrile copolymer (HNBR) matrix elastomer compound in the seam areas of the treated fabric 3.

The present invention is illustrated here with reference to one example of a synchronous flexible belt, but it must be understood that the term "teeth" can also be extended to the notches of notched belts, or to the longitudinal grooves or ribs of grooved or ribbed belts. Further, if desired, such a belt structure, as per the present invention, could also be used for non-synchronous belts, flat belts, or belts without teeth.

The accompanying FIGS. 1, 2, 3a and 3b also generally illustrate the example of a synchronous flexible belt with a smooth back 5, while it should be understood that the present invention can also apply to any flexible belt having, on at least one of its surfaces, teeth, notches or longitudinal grooves.

Figure 3A:
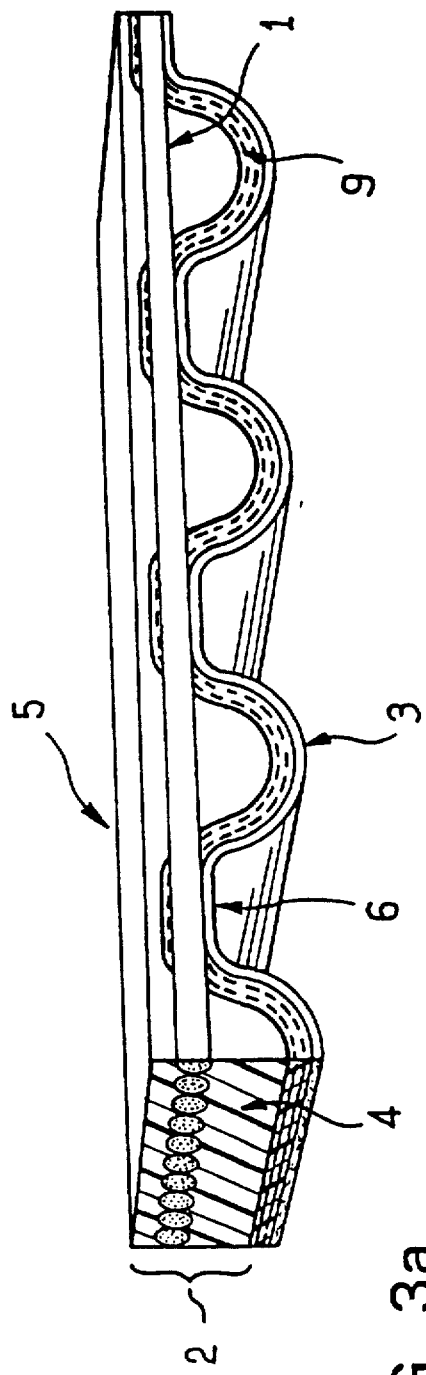
FIGS. 3a and 3b show two variants of belts with an anisotropically reinforced shield according to the present invention.
Figure 3B:
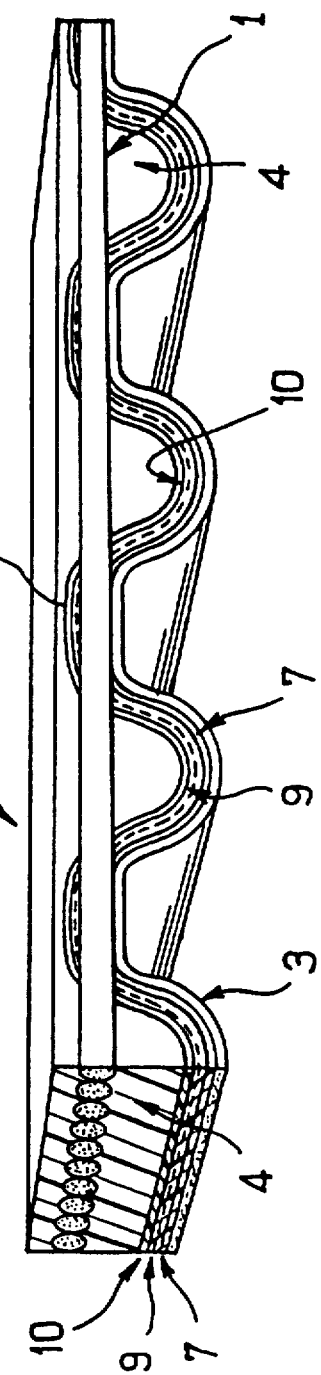

FIGS. 3a and 3b represent two structural variants of flexible belts made possible by the improvement of the present invention. In each of the embodiments shown in FIGS. 3a and 3b an anisotropy of the modulus of elasticity of the elastomer compounds can be achieved by the incorporation of short fibers into at least the intermediate layer 7. These fibers can preferably be textile, and they can also have a preferential orientation within the layer.

The fabrication process for a flexible toothed belt, such as a synchronous belt according to the present invention is described herebelow in conjunction with a discussion of the components which constitute the synchronous flexible belt. Such a process for manufacturing a belt, as illustrated in FIGS. 3a and 3b, essentially makes possible the anisotropic reinforcement of the elastomer compounds.

The layer forming the flexible armature 1 is preferably constructed by the spiral winding, with essentially adjacent turns, of at least a plurality of cords, or twisted textiles. These cords or textiles can generally be steel, glass or aromatic polyamide fibers. During the assembly, a layer of unvulcanized hydrogenated butadiene-acrylonitrile copolymer (HNBR) matrix elastomer compound of substantially uniform thickness can preferably be deposited on the treated fabric 3. This layer will essentially constitute the intermediate moderator element.

The contour of the teeth is preferably obtained during the vulcanization of the elastomer compounds. This can be achieved by veneering or plating of the treated fabric 3 against the internal profile of an assembly drum, under the effect of a pressure. The fabric 3 would have been previously given the appropriate impregnation treatment before the vulcanization steps.

In the variant illustrated in FIG. 3a, the hydrogenated butadiene-acrylonitrile copolymer (HNBR) matrix elastomer compound layer destined to form the intermediate moderator element can be advantageously reinforced with short fibers. These fibers can preferably be between about two-tenths of a millimeter to about twenty millimeters in length. Further, these fibers can preferably be natural fibers such as cotton or cellulose fibers, artificial or synthetic fibers such as rayon, polyamide or aromatic polyamide, polyester, polyvinyl alcohol or acrylic fibers. To give the hydrogenated butadiene-acrylonitrile copolymer (HNBR) matrix elastomer compound a modulus of elasticity compatible with the application for which the belt will be used, the weight ratio of fibrous additive can be limited to between about 30 parts fibers per about 100 parts elastomer.

The fibers in the elastomer compound can preferably be oriented in substantially the same direction by calendaring, that is, roller pressing of the elastomer compound during its formative stages. The elastomer compound is then preferably oriented so that the major orientation of the short fibers therein, i.e., the length dimension is longitudinal, that is, in planes essentially parallel to the cords of the flexible armature 1.

In FIG. 3a, the intermediate moderator element, constituted of hydrogenated butadiene-acrylonitrile copolymer (HNBR) matrix elastomer compound reinforced with oriented short fibers, forms an anisotropically reinforced shield or barrier 9 instead of a protective pad 7 as in the preceding variant.

Preferably, the anisotropically reinforced barrier 9 has a thickness between about 0.1 to about 0.6 times the height of the teeth. The height of the teeth, in this context, is essentially the height measured between the treated fabric 3 and the flexible armature 1.

During the following step in the construction of the belt, this first layer of hydrogenated butadiene-acrylonitrile copolymer (HNBR) matrix elastomer compound is covered by the layer of alkylated (ACSM) or non-alkylated (CSM) chlorosulfonated ethylene-alpha-olefin copolymer matrix elastomer compound. This layer of ACSM or CSM elastomer compound is generally of a thickness necessary to constitute the substrate 2 of the toothed belt.

The above-discussed preferential orientation given to the short reinforcement fibers of the hydrogenated butadiene-acrylonitrile copolymer (HNBR) matrix elastomer compound of the anisotropically reinforced shield 9 of the variant of FIG. 3a, does not interfere with the transversal by the HNBR layer of the cords of the flexible armature 1 which remain in parallel planes. This preferential orientation of the fibers is essentially also not modified during the traversal, or embedding, of the cords of the flexible armature 1 in this shield 9. In relation to the initial perimeter of the interface, the increase in length of the interface between the two elastomer compounds of hydrogenated butadiene-acrylonitrile copolymer (HNBR) matrix and alkylated (ACSM) or non-alkylated (CSM) chlorosulfonated ethylene-alpha-olefin copolymer matrix, is a condition favorable to maintaining the preferential orientation of the fibers. This is believed to be a result of the shear which the increase in length causes in the elastomer compound reinforced with the short fibers.

After vulcanization, the reinforced elastic compounds have a high modulus of elasticity in the direction of the major orientation of the short fibers, while in the two orthogonal directions, their modulus of elasticity is essentially that of the elastomer matrix. During manufacture, under the effect of the temperature which reduces the viscosity of the elastomer compounds, and under the effect of the pressure exerted on the back 5 of the belt, the two elastomer compounds will successively form the anisotropically reinforced shield 9 and the core of the teeth 4. As the teeth are formed, the treated fabric 3 is pressed into the tooth shapes imposed on the teeth by the assembly drum. This formation of the teeth generally occurs before an intimate bond is achieved between the various components of the flexible belt by a vulcanization step, and before the final shape is given to the flexible toothed belt.

After the steps of vulcanization, machining of the back of the belt, and cutting of the belt into individual flexible toothed belts ready for shipment, both the short reinforcement fibers and the treated fabric 3 are found to be intimately impregnated by the hydrogenated butadiene-acrylonitrile copolymer (HNBR) matrix elastomer compound. This impregnation helps protect the reinforcement fibers and the treated fabric 3 against any contamination by oil sprays.

In addition to this protective screen provided by the HNBR elastomer compound, the elastomer compound of the substrate 2, made of alkylated (ACSM) or non-alkylated (CSM) chlorosulfonated ethylene-alpha-olefin copolymer matrix, which is more sensitive to chemical aggressions, contributes mechanical strength to the teeth and to the intimate physico-chemical bond of the ACSM or CSM elastomer to the flexible armature 1. The ACSM or CSM elastomer compounds contribute to the mechanical strength because, under severe stresses, its mechanical properties are enduring, even in the face of long-term exposure to high temperature.

FIG. 3b illustrates another variant of a flexible belt, here a synchronous belt, improved according to the invention, where the intermediate moderator element combines a protective pad 7 and an anisotropically reinforced barrier 9, and possibly also a bonding layer 10. Such a bonding layer 10 can also be reinforced.

The succession of the elastomer compounds required, during the fabrication, to traverse the layer of cords constituting the flexible armature 1 can be modulated, at the time the belt is constructed, to constitute a structure which encloses one or two elastomer compounds reinforced with short fibers. One of these elastomer compounds can be the hydrogenated butadiene-acrylonitrile copolymer (HNBR) matrix and the other an alkylated (ACSM) or non-alkylated (CSM) chlorosulfonated ethylene-alpha-olefin copolymer matrix. Such reinforced elastomer compounds would typically be enclosed between the hydrogenated butadiene-acrylonitrile copolymer (HNBR) matrix elastomer compound (constituting the protective pad 7 in contact with the treated fabric 3 covering the surface of the teeth) and the alkylated (ACSM) or non-alkylated (CSM) chlorosulfonated ethylene-alpha-olefin copolymer matrix elastomer compound (forming the core of the teeth 4 and the back 5 of the belt).

Therefore, the toothed flexible belt, in the most complete structure, starting from the treated fabric 3, can consist successively, of the following layers:
- a protective pad 7 formed by a thin layer of hydrogenated butadiene-acrylonitrile copolymer (HNBR) matrix elastomer compound, intimately bonded by a physico-chemical method to the treated fabric 3, which HNBR compound of pad 7 can be formulated identical to or different from the formulation of the HNBR compound impregnating fabric 3;
- an anisotropically reinforced barrier 9 made of elastomer compound of preferably the same type as that of the protective pad 7, i.e. a hydrogenated butadiene-acrylonitrile copolymer (HNBR) matrix, and preferably reinforced with short fibers;
- a bonding layer 10 realized from an alkylated (ACSM) or non-alkylated (CSM) chlorosulfonated ethylene-alpha-olefin copolymer matrix, i.e., preferably of the same copolymer matrix as the elastomer compound of the substrate 2 which follows it, but reinforced with short fibers of artificial or synthetic textiles, which can preferably be polyamide, aromatic polyamide, polyester, polyvinyl alcohol or acrylic fibers, wherein the weight ratio of the fibers is substantially equal to a maximum of about 30 parts fibers per about 100 parts of elastomer; and
- the elastomer compound of the substrater 2, an alkylated (ACSM) or non-alkylated (CSM) chlorosulfonated ethylene-alpha-olefin copolymer matrix constituting the core of the teeth 4 and the back of the belt 5, and which generally is not reinforced.

Optionally, one of the layers of reinforced elastomer compound, i.e., either the anisotropically reinforced barrier 9, or the bonding layer 10, both of which can also be reinforced, can be omitted, when the belts would be used under less severe conditions.

Each of the elastomer compound layers of the belt is essentially intimately bonded by a physico-chemical method to the elastomer compound layer with which it is in contact. Thus, the elastomer compound layers can be bonded to other elastomer compound layers of an identical or different type, with the differences ranging from only slight formulation modifications to completely different elastomer base compositions.

The modulus of elasticity of layers 9 and 10 can be varied with the weight content of fiber reinforcement embedded therein. Under this context, the superimposition of these different layers of elastomer compounds makes it possible to establish a double gradient of the moduli of elasticity in the structure of the synchronous flexible belt. This modulus thereby extends from the treated fabric 3, covering the surface of the teeth, to the back 5 of the belt. Further, this structure also makes possible a progressive structure according to the resistance of the layers to oil, starting from the layer which is most resistant to the oils, or the hydrogenated butadiene-acrylonitrile copolymer (HNBR) matrix elastomer compound of the protective pad 7, to the substrate 2 forming the core of the teeth 4 and the back 5 of the belt. Further, it is substrate 2 which is the most resistant to mechanical fatigue at elevated temperatures, as this substrate generally consists of an alkylated (ACSM) or non-alkylated (CSM) chlorosulfonated ethylene-alpha-olefin copolymer matrix elastomer compound.

The structure of the flexible toothed belt constituted with the above-described layers, makes it possible, because of the localization of the interface between two elastomer compounds of different types in the core of the elastomer compounds reinforced with short fibers, to reduce the deformability of the assembly, and thus reduce the risks of incipient defects. The interface between the elastomer compounds of different types is generally a zone which is particularly brittle under high stresses.

Preferably, the elastomer compounds reinforced with short fibers, used in the anisotropically reinforced barrier 9 and the likewise reinforced bonding layer 10, have viscosities and moduli of elasticities such that, during assembly, the flexible armature 1 can be mostly embedded in the reinforced elastomer compounds.

The thickness of each of the elastomer compounds reinforced with short fibers, or the sum of their total thicknesses, can preferably be between about 0.7 to about 1.3 times the thickness of the layer of cords forming the flexible armature 1.

The alkylated (ACSM) or non-alkylated (CSM) chlorosulfonated ethylene-alpha-olefin copolymer matrix elastomer compounds which constitute the back 5 of the belt, the substrate 2 of the teeth and, possibly, the bonding layer 10 can also contain, in addition to the base polymer, additives which protect against the action of oxygen or ozone, additives which improve workability, plasticizers, vulcanizing agents and a reinforcing powder additive, which can be black or clear. Likewise, the hydrogenated butadiene-acrylonitrile copolymer (HNBR) matrix elastomer compounds which constitute the intermediate moderator element - protective pad 7 or anisotropically reinforced barrier 9, and which are also a component of the impregnation system of the treated fabric 3 - can also preferably contain similar additives to those listed above. In addition to these additives, the elastomers can also include a fibrous reinforcement material, preferably consisting of short fibers, i.e. fibers whose length is between about two-tenths of a millimeter and about twenty millimeters.

The standard formulations of elastomer components are presented below by way of non-restricting examples. The limits of the proportions by weight are indicated per one hundred parts of the base polymer.

| COMPONENT | MATRIX ELASTOMER COMPOUND | |
|---|---|---|
| | HNBR | CSM OR ACSM |
| Polymer | 100 | 100 |
| Antioxidant/anti-ozone additive | 0-12 | 0-10 |
| Powder reinforcing additive | 0-100 | 0-100 |
| Additives to improve workability and/or plasticizers | 2-40 | 2-40 |
| Vulcanizing agents | 4-30 | 4-15 |
| Fiber reinforcement additives | 0-30 | 0-30 |

Preferably, the powder additive can consist either of carbon black of silica, and the plasticizers can most frequently be ethers or esters for each of the three types of elastomer compounds listed.

The vulcanizing system of the hydrogenated butadiene-acrylonitrile copolymer (HNBR) matrix elastomer compound, whether or not reinforced by short fibers, can preferably be at least one of:
- a sulfur-base type—including zinc oxide, stearic acid and an accelerator or sulfur donor;

a mixed type—with a sulfur base type and a zinc peroxide;

a peroxide type—including an organic peroxide and a coagent; or even a base of zinc acrylate or its derivatives, used alone or in combination with the types described above.

The vulcanizing system of the alkylated (ACSM) or non-alkylated (CSM) ethylene-alpha-olefin copolymer matrix, whether or not reinforced by short fibers, can preferably be at least one of:

a sulfur-base type;
a pentaerythritol-base type;
a bismaleimide type;
an organic peroxide type; or
any other system conventionally used for the curing of ethylene-alpha-olefin copolymer matrix (CSM) compounds.

In fiber reinforced elastomer compounds, the short fibers preferably have a length between about 0.2 millimeters and about 20 millimeters, and can generally be made from at least one of: natural fibers, i.e. cotton or cellulose fibers, artificial fibers such as rayon, or synthetic fibers based on polyamide, aromatic polyamide, polyester, polyvinyl alcohol or acrylic fibers.

To allow the processing of the elastomer compounds during the assembly of the flexible belt, the weight content of the fibers is preferably limited to a maximum of about thirty parts fibers per about one hundred parts of base elastomer.

In a preferred realization, synchronous flexible belts have been fabricated according to the invention with a flexible armature 1 of glass cord treated by an adherization system suitable for achieving its adherence to elastomer compounds with which it will be in contact.

The belts as described hereinabove have been subjected to endurance tests on a power transmission test device. On this device, the drive pulley had 19 teeth and the take-up pulley had 37 teeth. The device was further equipped with a tension roller which was 60 millimeters in diameter and in contact with the back of the synchronous flexible belt. The speed of the drive pulley was 3000 revolutions per minute and the power transmitted was essentially a constant 6 Kilowatts. Under these test conditions, the temperature in the housing was about 95 decrees C. for about 90% of the time, and about 115 degrees C. for about 10% of the time.

The synchronous flexible belts according to the present invention were tested in comparison with heat-resistant belts of the prior art. The belts were first tested in their initial state, as manufactured. Further tests were done after immersion of the belts for 24 hours in motor oil at 100 degrees C. (Condition I-100) or at 120 degrees C. (Condition I-120) and, in another test, with a spray of hot motor oil for the duration of the test (Condition A).

The results obtained on the synchronous belts according to the invention are compared below to the results obtained on belts of the prior art. The results are expressed in hours of useful life on the test device under the severe conditions indicated above.

In the initial state of the belts, the two types of synchronous flexible belts, that is, a belt according to the present invention and a belt according to the prior art, were found to have life spans which were very similar, and on the order of about 650 to about 670 hours.

In the remaining tests, the following results were obtained:

| BELT TESTING CONDITIONS | LIFE IN HOURS | | Ratio of the life spans of belts according to the invention and belts according to the prior art |
|---|---|---|---|
| | synchronous belt according to the invention | synchronous belt according to the prior art | |
| I - 100 | 650 | 320 | 2.0 |
| I - 120 | 650 | 120 | 5.4 |
| A | >1500 | 420 | >3.5 |

Under Condition A, where the synchronous flexible belts are sprayed with hot motor oil for the entire duration of the test, the synchronous flexible belt according to the invention was found to have a life span which is more than about three times longer than that of the heat-resistant synchronous flexible belt of the prior art.

The advantages obtained by the improvement of the toothed flexible belts which are the object of the present invention are:

the protection of the alkylated (ACSM) or non-alkylated (CSM) ethylene-alpha-olefin copolymer matrix elastomer compound which contributes mechanical strength at elevated temperatures from any degradation by hot motor oil, due to the interposition of the protective pad 7 made of hydrogenated butadiene-acrylonitrile copolymer (HNBR) matrix elastomer compound;

the improvement of the homogeneity of the most highly-stressed points by continuity of hydrogenated butadiene-acrylonitrile copolymer (HNBR) matrix elastomer compound, up to contact with the flexible armature 1;

the reduction of the wick effect promoting the absorption of oil, thanks to the fact that all the discontinuities in the textile materials, in particular the seams of the treated fabric 3 and their exposed edges, are embedded in the hydrogenated butadiene-acrylonitrile copolymer (HNBR) matrix elastomer compound, which provides protection against oil sprays;

in one preferred variant, the limitation of the propagation of defects, and in particular of hairline cracks which cause a reduction in the useful life of the toothed flexible belt, by locating the interface between elastomer compounds of different types between elastomer compounds reinforced with short fibers.

In conclusion, the useful life of toothed flexible belts improved according to the invention is significantly increased by the proposed structure, under normal conditions and in several operating conditions at high temperature with risks of exposure to hot oil.

A technician skilled in the art will be able to adapt the composite structure and the formulation of the elastomer compounds, as well as the relative thickness of the layers, to different types of belts, e.g. synchronous, corrugated, toothed or notched, without going beyond the context of the invention.

One feature of the invention resides broadly in the toothed flexible belt, and in particular a synchronous belt, in which the back 5 of the belt and the teeth 4 on at least one of the sides of the flexible belt are formed by a substrate 2 of alkylated (ACSM) or non-alkylated (CSM) chlorosulfonated ethylene-alpha-olefin copolymer matrix and are combined with a hydrogenated butadiene-acrylonitrile copolymer (HNBR) matrix elastomer compound which covers the surface of the teeth, protected by a treated fabric 3, impregnated with a hydrogenated butadiene-acrylonitrile copolymer (HNBR) matrix elastomer compound, characterized by the fact that the bonding interface between, on one hand, the hydrogenated butadiene-acrylonitrile copolymer (HNBR) matrix elastomer compound constituting the impregnation material of the treated fabric 3 and, on the other hand, the alkylated (ACSM) or non-alkylated (CSM) chlorosulfonated ethylene-alpha-olefin copolymer matrix forming the substrate 2 of the back of the belt 5 and of the teeth, is offset toward the interior of the teeth, a zone which is subjected to less stress during the operation of the toothed flexible belt, thanks to the interposition of an intermediate moderator element 7 and/or 9, so that the mechanical strength of the toothed flexible belt at high temperatures is not changed by sprays of hot oil originating from the engine, by the fact that the intermediate moderator element 7 and/or 9 is made of a hydrogenated butadiene-acrylonitrile copolymer (HNBR) matrix elastomer compound, of a nature identical to or different from the elastomer compound for the impregnation of the treated fabric 3, and by the fact that the cord constituting the flexible armature 1 of the belt is embedded, in the zone located between two consecutive teeth, in the hydrogenated butadiene-acrylonitrile copolymer (HNBR) matrix elastomer compound constituting the intermediate moderator element 7, 9.

Another feature of the invention resides broadly in the toothed flexible belt and, in particular, a synchronous belt, characterized by the fact that the intermediate moderator element 7 and/or 9 has a thickness between 0.1 and 0.6 times the height of the teeth measured between the treated fabric 3 and the flexible armature 1.

Yet another feature of the invention resides broadly in the toothed flexible belt and, in particular, a synchronous belt, characterized by the fact that the intermediate moderator element is a protective pad 9 made of hydrogenated butadiene-acrylonitrile copolymer (HNBR) matrix elastomer compound which is homogeneous, i.e. which does not include short fiber reinforcements.

Still another feature of the invention resides broadly in the toothed flexible belt and, in particular, a synchronous belt, characterized by the fact that the intermediate moderator element is an anisotropically reinforced shield 9 made of hydrogenated butadiene-acrylonitrile copolymer (HNBR) matrix elastomer compound reinforced with short fibers, preferably oriented in planes parallel to those of the cords of the flexible armature 1.

Still yet another feature of the invention resides broadly in the toothed flexible belt and, in particular, a synchronous belt, characterized by the fact that its structure has, from the treated fabric 3 to the back of the belt 5, the protective pad 7 made of hydrogenated butadiene-acrylonitrile copolymer (HNBR) matrix elastomer compound, which is homogeneous, the anisotropically reinforced shield 9 made of hydrogenated butadiene-acrylonitrile copolymer (HNBR) matrix elastomer compound reinforced with short fibers, and the substrate 2, of alkylated (ACSM) or non-alkylated (CSM) chlorosulfonated ethylene-alpha-olefin copolymer matrix elastomer compound which is homogeneous.

Another feature of the invention resides broadly in the toothed flexible belt and, in particular, a synchronous belt, characterized by the fact that its structure has, from the treated fabric 3 to the back of the belt 5, the protective pad 7, made of hydrogenated butadiene-acrylonitrile copolymer (HNBR) matrix elastomer compound, which is homogeneous, a bonding layer 10 also reinforced, made of alkylated (ACSM) or non-alkylated (CSM) chlorosulfonated ethylene-alpha-olefin copolymer matrix elastomer compound reinforced with short fibers, and the substrate 2 of alkylated (ACSM) or non-alkylated (CSM) chlorosulfonated ethylene-alpha-olefin copolymer matrix, which is homogeneous.

Still another feature of the invention resides broadly in the toothed flexible belt and, in particular, a synchronous belt, characterized by the fact that its structure has, from the treated fabric 3 to the back of the belt 5, the anisotropically reinforced shield 9 made of hydrogenated butadiene-acrylonitrile copolymer (HNBR) matrix elastomer compound reinforced with short fibers, the bonding layer 10, also reinforced and made of alkylated (ACSM) or non-alkylated (CSM) chlorosulfonated ethylene-alpha-olefin copolymer matrix elastomer compound reinforced with short fibers, and the substrate 2 made of alkylated (ACSM) or non-alkylated (CSM) chlorosulfonated ethylene-alpha-olefin copolymer elastomer compound, which is homogeneous.

Yet another feature of the invention resides broadly in the toothed flexible belt and, in particular, a synchronous belt, characterized by the fact that its structure includes, from the treated fabric 3 to the back 5 of the belt, the protective pad 7 made of hydrogenated butadiene-acrylonitrile copolymer (HNBR) matrix elastomer compound which is homogeneous, the anisotropically reinforced shield 9, made of hydrogenated butadiene-acrylonitrile copolymer (HNBR) matrix elastomer compound reinforced with short fibers, the bonding layer 10, also reinforced, made of alkylated (ACSM) or non-alkylated (CSM) chlorosulfonated ethylene-alpha-olefin copolymer matrix reinforced with short fibers, and the substrate 2 made of alkylated (ACSM) or non-alkylated (CSM) chlorosulfonated ethylene-alpha-olefin copolymer matrix elastomer compound, which is homogeneous.

Still yet another feature of the invention resides broadly in the toothed flexible belt, in particular a synchronous belt, characterized by the fact that the thickness of each of the elastomer compound layers reinforced with short fibers of the anisotropically reinforced shield 9 and of the bonding layer which is also reinforced 10, or the sum of their thicknesses, is between about 0.7 and about 1.3 times the thickness of the layer of cords forming the textile armature 1.

Another feature of the invention resides broadly in the toothed flexible belt and, in particular, synchronous belt, characterized by the fact that the content by weight of short fibers in the elastomer compounds of the anisotropically reinforced shield 9 and of the bonding layer 10 which is also reinforced is a maximum of about 30 parts per about 100 parts of elastomer.

Yet another feature of the invention resides broadly in the toothed flexible belt and, in particular, synchronous belt, characterized by the fact that the reinforcement of the elastomer compounds of the anisotropically reinforced shield 9 and of the bonding layer 10, also reinforced, consists of natural, artificial or synthetic textile fibers of a length between about two-tenths of a millimeter and about 20 millimeters.

Still another feature of the invention resides broadly in the toothed flexible belt, in particular a synchronous belt, characterized by the fact that the reinforcement of the elastomer compounds of the anisotropically reinforced barrier 9 and of the bonding layer, also reinforced 10, consists of short polyamide or aromatic polyamide fibers.

Yet still another feature of the invention resides broadly in the toothed flexible belt, in particular a synchronous belt characterized by the fact that the reinforcement of the elastomer compounds of the anisotropically reinforced shield 9 and of the bonding layer 10, also reinforced, consists of short polyvinyl alcohol fibers.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A toothed endless belt power transmission system comprising:
    mechanical power generating means for generating mechanical power;
    a first wheel device being connected to and receiving mechanical power from said mechanical power generating means;
    a second wheel device positioned in spaced apart relation to said first wheel device, said second wheel device being connected to and receiving at least a portion of said mechanical power from said first wheel device;
    toothed belt means disposed about and connected between said first wheel device and said second wheel device for transferring mechanical power from said first wheel device to said second wheel device, said belt means having a first surface for being disposed towards said first and said second wheel devices, and a second surface opposite to said first surface; and
    belt tensioning means for being in contact with said second surface of said belt means for adjusting a tension of said belt means about said first and second wheel devices;
    said toothed belt means comprising:
        a plurality of teeth disposed along said first surface, said plurality of teeth being spaced apart from one another along a longitudinal dimension of said belt means, and adjacent ones of said spaced apart teeth defining a first surface portion therebetween;
        at least said second surface and a substantial portion of said teeth comprising a first material having high mechanical strength;
        a covering disposed on said first surface of said belt means, said covering comprising a second material;
        an intermediate layer disposed between said first material and said covering, said intermediate layer being configured for distributing stress towards an interior of said belt means;
        said second material comprises at least one component and said intermediate layer comprises at least one component, said at least one component of said second material being the same as said at least one component of said intermediate layer, said at least one component extending through said covering and said intermediate layer; and
        reinforcement stands disposed within said belt means in a direction along the longitudinal dimension of said belt means;
        said reinforcement strands being disposed in said belt means at substantially equal distances from said second surface of said belt means; and
        said reinforcement strands alternately passing through said first material of said teeth and said intermediate layer at said first surface portion between the adjacent ones of said spaced apart teeth.

2. The power transmission system according to claim 1, further including at least one additional layer disposed at at least one of:
    between said first material and said intermediate layer, and
    between said intermediate layer and said covering;
    said at least one additional layer disposed between said first material and said intermediate layer comprising a material having at least one component the same as a component of said first material; and
    said at least one additional layer, disposed between said intermediate layer and said covering, comprising a material having at least one component the same as said at least one component of said second material.

3. The power transmission system according to claim 2, wherein:
    said first material comprises a first elastomer compound having high mechanical strength at elevated temperatures produced by said power generating means;
    said second material and said intermediate layer comprise a second elastomer compound having a high resistance to degradation by oils at said elevated temperature; and
    said covering comprises a fabric impregnated with said second elastomer compound.

4. The power transmission system according to claim 3, wherein:
    said second elastomer compound comprises a hydrogenated butadiene-acrylonitrile copolymer matrix, said second material and said intermediate layer being one of:
        a same formulation of the hydrogenated butadiene-acrylonitrile copolymer matrix, and
        different formulations of the hydrogenated butadiene-acrylonitrile copolymer matrix; and said first elastomer compound comprises at least one of:
        alkylated chlorosulfonated ethylene-alpha-olefin copolymer matrix; and non-alkylated chlorosulfonated ethylene-alpha-olefin copolymer matrix.

5. The power transmission system according to claim 4, wherein:
said teeth have a height measured from said reinforcement strands to said covering;
said intermediate layer has a thickness; and
said thickness of said intermediate layer being about 0.1 to about 0.6 times the height of said teeth.

6. The power transmission system according to claim 5, wherein:
said at least one additional layer disposed between said first material and said intermediate layer comprises one of:
alkylated chlorosulfonated ethylene-alpha-olefin copolymer matrix elastomer compound; and
non-alkylated chlorosulfonated ethylene-alpha-olefin copolymer matrix elastomer compound;
said at least one additional layer disposed between said intermediate layer and said covering comprises a hydrogenated butadiene-acrylonitrile copolymer matrix elastomer compound; and
at least one of said at least one additional layer comprising reinforcement fibers.

7. The power transmission according to claim 6, wherein:
said at least one additional layer has a longitudinal dimension;
said at least one additional layer comprising about at least 30 parts reinforcement fibers to about 100 parts elastomer compound;
said reinforcement fibers have a longitudinal dimension and said longitudinal dimension of said reinforcement fibers being oriented parallel to the longitudinal dimension of said at least one additional layer;
said reinforcement fibers comprise at least one of:
natural fibers,
artificial textile fibers, and
synthetic textile fibers; and
said reinforcement fibers have a length between about 0.2 mm to about 20 millimeters.

8. The power transmission element according to claim 7, wherein:
each of said at least one additional layer has a thickness and said reinforcement strands have a thickness, the thickness of one of:
each of said at least one additional layer, and
a combination of every said at least one additional layer,
is about 0.7 to about 1.3 times the thickness of the reinforcement strand;
said reinforcement fibers comprise at least one of:
cellulose fibers,
rayon fibers,
polyamide fibers,
aromatic polyamide fibers,
polyester fibers,
polyvinyl alcohol fibers, and
acrylic fibers;
said reinforcement strands comprise one of:
twisted steel fibers,
twisted glass fibers, and
twisted aromatic polyamide fibers;
said fabric covering comprises twilled fabric impregnated with elastomer compound;
said fabric having at least a first end and a second end, said first and second ends forming a seam across said belt means, and said first end and said second end at said seam being embedded in said intermediate layer; and
each of said alkylated chlorosulfonated ethylene-alpha-olefin copolymer matrix elastomer compound, said non-alkylated chlorosulfonated ethylene-alpha-olefin copolymer matrix elastomer compound and said hydrogenated butadiene-acrylonitrile copolymer matrix elastomer compound comprise the following additional additives:
additives which protect against oxygen and ozone;
additives which improve workability;
plasticizers, said plasticizers comprising at least one of: ethers and esters of the elastomer compounds;
vulcanizing agents, said vulcanizing agents comprising at least one of: sulphur-based agents and peroxide based agents; and
reinforcing powder, said reinforcing powder comprising at least one of: carbon black and silica.

9. A toothed flexible belt for an endless belt power transmission system, said belt having an inner surface, an outer surface, a longitudinal dimension, and a length along said longitudinal dimension, said inner surface comprising a plurality of spaced apart teeth disposed on said inner surface, adjacent ones of said spaced apart teeth defining a base surface therebetween, and said belt comprising:
a first material having a high mechanical strength at operating temperatures of the power transmission system, said first material comprising at least said outer surface and a substantial portion of said teeth;
cover means disposed on said inner surface to cover said inner surface and protect said first material;
at least one intermediate layer disposed between said first material and said cover means, said at least one intermediate layer having an essentially constant thickness over the length of said belt, and said at least one intermediate layer for distributing stress towards an interior of said belt;
said intermediate layer comprising at least one component;
said cover means comprising at least one component;
said at least one component of said intermediate layer being the same as said at least one component of said cover means, said at least one component extending through said cover means and said at least one intermediate layer;
an interface surface between said first material and a material comprising said at least one component, said interface surface being disposed spaced away from said cover means towards said interior of said belt by means of said intermediate layer to reduce shear stresses at said at least one interface; and
reinforcement strands disposed within said belt in a direction along the longitudinal dimension of said belt;
said reinforcement strands being disposed in said belt at substantially equal distance from said second, outer surface of said belt; and
said reinforcement strands alternately passing through said first elastomer of said teeth and said third elastomer of said intermediate layer at said base surface between the adjacent ones of said spaced apart teeth.

10. The toothed flexible belt for an endless belt power transmission system according to claim 9, wherein:
said cover means and said intermediate layer comprise one of:

a same formulation of a hydrogenated butadiene-acrylonitrile copolymer matrix elastomer compound, and different formulations of a hydrogenated butadiene-acrylonitrile copolymer matrix elastomer compound; and said first material of at least said outer surface and said teeth comprises at least one of:

alkylated chlorosulfonated ethylene-alpha-olefin copolymer matrix elastomer compound; and non-alkylated chlorosulfonated ethylene-alpha-olefin copolymer matrix elastomer compound.

11. The toothed flexible belt for an endless belt power transmission system according to claim 10, further comprising at least one additional layer disposed at at least one of:

between said first elastomer and said intermediate layer, and between said intermediate layer and said fabric covering;

said at least one additional layer disposed between said first elastomer and said intermediate layer comprising at least one of:

alkylated chlorosulfonated ethylene-alpha-olefin copolymer matrix;

non-alkylated chlorosulfonated ethylene-alpha-olefin copolymer matrix; and said at least one additional layer disposed between said intermediate layer and said fabric covering comprising at least one of:

a same formulation of the hydrogenated butadiene-acrylonitrile copolymer matrix elastomer compound as said second and third elastomers;

different formulations of the hydrogenated butadiene-acrylonitrile copolymer matrix elastomer compound as said second and third elastomers.

12. The toothed flexible belt for an endless belt power transmission system according to claim 11, wherein:

said at least one additional layer has a longitudinal dimension in said flexible belt;

at least one of said at least one additional layers comprises reinforcement fibers;

said reinforcement fibers have a longitudinal dimension, said longitudinal dimension of said reinforcement fibers being oriented parallel to the longitudinal dimension of said at least one additional layer; and said belt comprises one of the following structures A, B, C and D:

A) said fabric cover impregnated with a hydrogenated butadiene-acrylonitrile copolymer matrix elastomer compound;

said at least one intermediate layer comprising a hydrogenated butadiene-acrylonitrile copolymer matrix elastomer compound;

said at least one additional layer comprising a hydrogenated butadiene-acrylonitrile copolymer matrix elastomer compound reinforced with said reinforcement fibers; and said first elastomer comprising at least one of:
alkylated chlorosulfonated ethylene-alpha-olefin copolymer matrix;
non-alkylated chlorosulfonated ethylene-alpha-olefin copolymer matrix;

B) said fabric cover impregnated with a hydrogenated butadiene-acrylonitrile copolymer matrix elastomer compound;

said at least one intermediate layer comprising a hydrogenated butadiene-acrylonitrile copolymer matrix elastomer compound;

said at least one additional layer reinforced with said reinforcement fibers and comprising at least one of:
alkylated chlorosulfonated ethylene-alpha-olefin copolymer matrix;
non-alkylated chlorosulfonated ethylene-alpha-olefin copolymer matrix; and said first elastomer comprising at least one of:
alkylated chlorosulfonated ethylene-alpha-olefin copolymer matrix;
non-alkylated chlorosulfonated ethylene-alpha-olefin copolymer matrix;

C) said fabric cover impregnated with a hydrogenated butadiene-acrylonitrile copolymer matrix elastomer compound;

said at least one intermediate layer comprising a hydrogenated butadiene-acrylonitrile copolymer matrix elastomer compound reinforced with said reinforcement fibers;

said at least one additional layer reinforced with said reinforcement fibers and comprising at least one of:
alkylated chlorosulfonated ethylene-alpha-olefin copolymer matrix;
non-alkylated chlorosulfonated ethylene-alpha-olefin copolymer matrix; and said first elastomer comprising at least one of:
alkylated chlorosulfonated ethylene-alpha-olefin copolymer matrix;
non-alkylated chlorosulfonated ethylene-alpha-olefin copolymer matrix; and D) said fabric cover impregnated with a hydrogenated butadiene-acrylonitrile copolymer matrix elastomer compound;

said at least one intermediate layer comprising a hydrogenated butadiene-acrylonitrile copolymer matrix elastomer compound reinforced with said reinforcement fibers;

said at least one intermediate layer comprising a hydrogenated butadiene-acrylonitrile copolymer matrix elastomer compound without reinforcement;

said at least one additional layer reinforced with said reinforcement fibers and comprising at least one of:
alkylated chlorosulfonated ethylene-alpha-olefin copolymer matrix;
non-alkylated chlorosulfonated ethylene-alpha-olefin copolymer matrix; and said first elastomer comprising at least one of:
alkylated chlorosulfonated ethylene-alpha-olefin copolymer matrix;
non-alkylated chlorosulfonated ethylene-alpha-olefin copolymer matrix.

13. The toothed flexible belt for an endless belt power transmission system according to claim 12, wherein:

said at least one additional layer comprising about at least 30 parts reinforcement fibers to about 100 parts elastomer compound;

each of said at least one additional layer has a thickness and said reinforcement strands have a thickness, the thickness of one of:
each of said at least one additional layer, and
a combination of every said at least one additional layer, is about 0.7 to about 1.3 times the thickness of the reinforcement strand;

said reinforcement fibers have a length between about 0.2 mm to about 20 millimeters;

said reinforcement fibers comprise at least one of:
cellulose fibers,
rayon fibers,
polyamide fibers,
aromatic polyamide fibers,
polyester fibers,
polyvinyl alcohol fibers, and
acrylic fibers;

said reinforcement strands comprise one of:
twisted steel fibers,
twisted glass fibers, and
twisted aromatic polyamide fibers;

said fabric covering comprises twilled fabric impregnated with elastomer compound;

said fabric having at least a first end and a second end, said first and second ends forming a seam across said belt, and said first end and said second end at said seam being embedded in said intermediate layer; and each of said alkylated chlorosulfonated ethylene-alpha-olefin copolymer matrix elastomer compound, said non-alkylated chlorosulfonated ethylene-alpha-olefin copolymer matrix elastomer compound and said hydrogenated butadiene-acrylonitrile copolymer matrix elastomer compound comprise the following additional additives:
additives which protect against oxygen and ozone;
additives which improve workability;
plasticizers, said plasticizers comprising at least one of: ethers and esters of the elastomer compounds;
vulcanizing agents, said vulcanizing agents comprising at least one of: sulphur-based agents and peroxide based agents; and
reinforcing powder, said reinforcing powder comprising at least one of: carbon black and silica.

14. A toothed flexible belt for a power transmission system, said belt having an inner surface, an outer surface and a longitudinal dimension, said inner surface comprising a plurality of spaced apart teeth disposed across said inner surface, said teeth being spaced apart from one another in a direction along the longitudinal dimension of said belt, said belt comprising:

a first portion, said first portion comprising at least a substantial portion of said teeth and said outer surface, said first portion comprising a first elastomer compound having a high mechanical strength at operating temperatures of said power transmission system;

a fabric cover disposed on said inner surface to protect said first elastomer compound, said fabric cover comprising a second elastomer compound;

at least one intermediate layer disposed between said first portion and said fabric cover, said at least one intermediate layer for distributing stress towards an interior of said belt, said at least one intermediate layer comprising a third elastomer compound;

said first elastomer compound comprises at least one of:
an alkylated chlorosulfonated ethylene-alpha-olefin copolymer matrix elastomer compound;
a non-alkylated chlorosulfonated ethylene-alpha-olefin copolymer matrix elastomer compound;

said second elastomer compound comprises a hydrogenated butadiene-acrylonitrile copolymer matrix elastomer compound;

said third elastomer compound comprises a hydrogenated butadiene-acrylonitrile copolymer matrix elastomer compound;

said hydrogenated butadiene-acrylonitrile copolymer matrix elastomer compounds of said second elastomer and of said third elastomer comprise at least one of:
a same formulation of a hydrogenated butadiene-acrylonitrile copolymer matrix elastomer compound, and
different formulations of a hydrogenated butadiene-acrylonitrile copolymer matrix elastomer compound;

said belt comprises an interface surface between said hydrogenated butadiene-acrylonitrile copolymer matrix elastomer compound and said at least one of:
said alkylated chlorosulfonated ethylene-alpha-olefin copolymer matrix; and
said non-alkylated chlorosulfonated ethylene-alpha-olefin copolymer matrix;

said interface surface being disposed spaced away from said fabric covering towards said second surface of said belt to reduce sheer stresses at said interface;

adjacent ones of said spaced apart teeth define a base surface therebetween, and said belt further comprises:

reinforcement strands disposed within said belt in a direction along the longitudinal dimension of said belt;

said reinforcement strands being disposed in said belt a substantially equal distance from said outer surface of said belt; and said reinforcement strands alternately passing through said first portion of said teeth and said at least one intermediate layer at said base surface between the adjacent ones of said spaced apart teeth.

* * * * *

UNITED STATES PATENT AND TRADEMARK OFFICE
CERTIFICATE OF CORRECTION

PATENT NO. : 5,322,479
DATED : June 21, 1994
INVENTOR(S) : Christian LE DEVEHAT

It is certified that error appears in the above-indentified patent and that said Letters Patent is hereby corrected as shown below:

In column 18, line 18, Claim 1, after 'reinforcement', delete "stands" and insert -- strands--.

Signed and Sealed this

Fifth Day of November, 1996

Attest:

BRUCE LEHMAN

*Attesting Officer*   *Commissioner of Patents and Trademarks*